May 5, 1959   G. R. COULSON ET AL   2,885,339
RECOVERY OF OIL FROM OIL BEARING SANDS
Filed Nov. 23, 1956
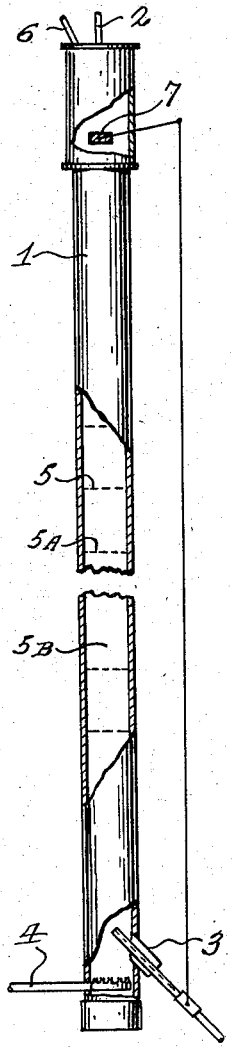

United States Patent Office 2,885,339
Patented May 5, 1959

2,885,339
RECOVERY OF OIL FROM OIL BEARING SANDS

Gordon R. Coulson and Lincoln Clark, Calgary, Alberta, Canada, assignors to Can-Amera Oil Sands Development Ltd., Calgary, Alberta, Canada Application November 23, 1956, Serial No. 624,072

4 Claims. (Cl. 208—11)

This invention relates to a method and apparatus for separating coarse sand from oil bearing sands and for effecting a preliminary recovery of the oil constituent thereof together with water, clay and other fines.

The oil sands of the Athabasca district of northwest Canada are bituminous sands and are made up of almost pure silica sand, each grain of which is surrounded by a layer of water, which in turn is surrounded by a film of oil. The oil is very viscous and has a specific gravity varying from about 1.000 to about 1.025. In addition to the oil thus intimately associated with the sand, there is a body of free oil between the sand particles, and a body of oil adsorbed by and/or intimately associated with the fine sand and clay particles which are found in the Athabasca oil sands in their natural state. The latter body i.e. the clay associated oil which may amount to as much as 12% of the total oil content has heretofore been lost with the sand in all prior processes of which we are aware.

It is a principal object of this invention to provide a method and apparatus permitting preliminary separating of the coarse silica sand from the oil, water, clay and other fines which are present in the natural state.

This and other advantageous objects will become apparent through a consideration of the following description taken in conjunction with the attached drawings in which the figure is a schematic view showing an apparatus designed to effect the concept of this invention.

It has been found that the coarse sand may be separated from the oil, water, clay and fines by treatment in a fluidizing tower subjected to a countercurrent flow of water through a sand column.

Generally the method consists in feeding downward, into the top of a tower, a slurry of oil bearing sand, diluent and water, maintaining a constant level of sand in the tower by constantly withdrawing sand from the bottom thereof, and forcing a stream of water upward through the sand column, counter current to the slurry, and withdrawing the overflow of oil, clay and other fines, and water.

According to the manner of this invention the raw oil-bearing sand may conveniently first be mixed with a diluent oil capable of dissolving the oil content. The use of such a diluent has the effect of reducing the viscosity and the specific gravity of the oil constituent thus permitting a separation in the manner hereinafter described. In their natural state specific gravity of the oil content varies from about 1.000 to 1.025. For reasons which will become apparent hereafter it is desirable to dilute the oil constituent to such an extent as to reduce the specific gravity of the diluted constituent substantially below 1.000 and preferably in the range of from 0.79 to 0.95.

The diluent oil must be a solvent capable of dissolving substantially all of the oil constituent and of reducing the specific gravity of the oil constituent substantially below 1.000. While relatively low boiling normally liquid hydro-carbons such as benzene, xylene, toluene, gasoline, either cracked or straight run, petroleum naphtha, coal tar naphtha, or the like may be employed provided precautions are taken to prevent loss thereof by evaporation, it is preferred to employ solvents having an initial boiling point of about 350–400° F. or higher, for example, the higher boiling petroleum naphthas, kerosene, gas-oil in the boiling range of furnace distillates or diesel fuels, etc. This obviates to a large degree the loss difficulties which might be encountered with the lower boiling materials and the recoveries of crude oil obtained are satisfactory. Oils of an aromatic or olefinic character are the most efficacious since certain constituents of the oil sands are more soluble in these than in predominantly paraffinic distillates. Indeed, where the tar-sand oil is of an asphaltic base, some constituents may be almost entirely insoluble in paraffinic solvents, particularly the lower boiling ones, and hence would not be recovered.

Where they are available, we prefer to employ the more unsaturated and/or aromatic distillates, either alone or admixed with some of the recovered oil, which may be produced during the thermal or catalytic cracking or coking of hydro-carbon oils. The constituents of the tar-sand seem to be somewhat more soluble in solvents of this character. Where such cracked distillates are available on the premises they may be produced in the form of side streams such as that normally employed as recycle stock in the cracking process. Thus, if the ultimately recovered oil is being cracked or coked at or near the recovery site, a side stream may be taken from the cracking or coke plant fractionating tower, and mixed with the sands, in the preliminary stage. The solvent may be recovered for re-use when the diluted oil is ultimately distilled by feeding to such plant or by a previous distillation process.

The sand may, as an additional or alternative step, conveniently be agitated with an aqueous phase in sufficient quantity to provide a slurry of convenient viscosity for handling by means of pipes, pumps, etc. as hereinafter described in detail.

This slurry is then fed into the upper portion of the body of a column in which a constant sand level is maintained.

To the bottom of the tower, water is supplied under pressure to create an upward flow at a rate of approximately 0.2 to 1.5 feet per minute free water velocity in the column, more or less as determined by the size of the sand grains.

In order to ensure even distribution of the water stream over the entire cross-sectional area of the column, the water may conveniently take the form of a plurality of upwardly or downwardly projecting jets located near the bottom of the tower and disposed at regular intervals over the cross-section of the tower.

Sand is continuously withdrawn from the bottom of the column to maintain the sand level in the column, while the overflow from the column, consisting of oil, clay and other fines, and water is continuously withdrawn from the top of the column.

In an installation of this type, the sand in the column may be considered as settled and initially motionless. As the rate of flow of the rising fluid is increased, the bed particles begin to move due to the lifting effect of the rising fluid. As the flow is increased, the motion of the particles increases. At a certain upward velocity, the sand becomes fluidized to a point where the abrasive action of the sand particles on each other causes rupture of the surrounding oil films, without however being sufficient to carry the solid particles upward in the stream. The oil thus released is carried upward with the rising water and discharged from the tower as an overflow product together with the clay and other fines of the raw sand. In a continuous column with slurry feed at top and with sand grains descending against the rising water, the rising water velocity required is reduced in part by the rate of descent of the sand in order to maintain good attrition condition.

This process is continuous—the oil-sand water slurry being continuously charged into the top, the water counter current from the bottom, the sand removed continuously from the bottom and the oil, clay, water and fines removed continuously by way of overflow, all at such rates as to maintain constant operating conditions within the tower.

If heat is introduced to the process, the output of the unit will be greatly increased due to the decrease in viscosity of water and oil. It has been found that the relative capacities at different operating temperatures are as follows:

| | |
|---|---|
| 46° F. | 1 |
| 85° F. | 2.4 |
| 120° F. | 4.8 |
| 200° F. | 10.0 |

It has been found in practice that adequate stripping of sand can be obtained in 15 minutes or less under the above conditions.

This method results in the discharge of a clean, oil-free silica sand which has commercial application in itself in the glass and other industries and a mixture of oil, clay and water which may be separated by means of the method described in a co-pending application or other suitable means.

The separation of the coarse sand is especially advantageous as a preliminary step to the process of separation described in a co-pending application, since that process, requiring as it does a centrifugal separation of the constituents, is greatly speeded through the large reduction in the mass of the charge made possible through preliminary elimination of the coarse sand particles.

It has been found in practice that to obtain the full benefit of the separation afforded by this invention, a plurality of partitions or perforated trays should be provided transversely across the tower and at spaced intervals therein. Such trays minimize the localization of flows of unstripped material and tend to distribute the upward water flow more evenly over the entire column area.

Illustrated in the drawing is a form of tower designed to effect the concept of this invention. In the drawing, the tower is indicated generally as at 1. The oil slurry is introduced into the tower at the top as by means of inlet pipe 2. The sand in the column is maintained at a suitable level by the continuous withdrawal of sand through outlet nozzle 3 located at the bottom of the tower. Sand thus withdrawn will be found to be substantially free of oil and of a high degree of cleanliness. Water is supplied to the bottom of the tower as at inlet 4, and under sufficeint pressure to provide an upward flow of water at a rate of 0.2 to 1.5 feet per minute free velocity. This water is removed through outlet 6 at the top of the tower.

In order to maintain the sand bed at the proper level, a float 7 which will sink in water but which will float on fluidized sand of about 1.5 specific gravity may be provided at the upper portion of the tower, and its rise and fall adapted to open and close the sand discharge. These liquid level controls are well known in the art and since they do not form part of this invention will not be described in detail herein.

A plurality of baffles 5, 5A, 5B etc. are located transversely across the tower 1 in the direction of flow. These baffles consist of perforated trays which in tests carried out have had 28.6% openings area of column cross-section area with effective results.

At the top of the tower, an overflow outlet pipe is provided through which the oil, water, clay and other fines may be continuously withdrawn.

To make the most effective use of this invention, the oil sand, in hot or cold state, with or without diluent, should (as has already been mentioned) be agitated in the presence of an excess of water to the degree that consolidation of the sand grains one to the other with oil as the adhesive, is substantially eliminated. Unconsolidated sand grains will form a fluidized bed in the tower and slowly descend with complete cleaning of oil and clay from the sand grains. A consolidated group of sand grains will settle rapidly through the sand bed without adequate cleaning, and is, therefore, undesirable. The agitation of the sand in the presence of water to effect unconsolidation may be effected by means of spinners as described in a co-pending application, by jet action of water on the consolidated mass of sand, by the action of centrifugal pumps when fed by a mixture of sand and water, by the turbulence caused when a slurry of oil-sand and water is passed through piping, or other suitable methods or combination of methods. A portion of the oil may be removed in the unconsolidation step as the overflow with water, as in the above-mentioned spinner application or with the water overflow during the unconsolidation step by jet action of water on the consolidated mass of sand, or all of the oil may remain in the oil-sand in a water dispersion mixture as introduced into the top of the tower and be removed with overflow water and clay from the top of the vessel. Oil films surrounding the sand grains may be partially ruptured in the unconsolidation of the oil sand in the water mixture. Complete removal of clay and oil from the sand will be accomplished in the sand tower.

Another important advantage of this invention arises if the charge into the tower is heated as would be the case if it were subjected to a preliminary hot settling. In this case, the sand, which occupies the great bulk of the raw charge also holds the major portion of the heat. When this heated charge comes into contact with the upward flow of cold water in the tower a heat exchange takes place so that the sand which is withdrawn from the bottom of the tower, is cold, while the water-oil clay slurry removed from the top of the tower, is hot. This, of course, is a most desirable condition, since the sand from the tower is an end product, while the slurry always requires further treatment in which heat may well be required or advantageous.

In the foregoing specification, preferred steps and a specific example have been given for the purpose of illustrating the nature of the invention. It is to be understood that many steps are preferred but are not critical to the operation of the invention, and that the preferred steps and specific quantities are given by way of example only and are not intended to be limitations of the invention. Such embodiments of the invention as come within the scope and purview of the appended claims are to be considered as part of this invention.

What we claim as our invention is:

1. The method of separating coarse sand from oil-bearing sands which comprises diluting the oil phase through addition of a diluent of lesser specific gravity than the oil, in an amount sufficient to reduce the specific gravity of said oil substantially below 1.00, feeding the diluted oil-bearing sands into the upper portion of a tower, introducing a stream of water to the bottom of the tower under sufficient pressure to provide an upward water flow of from 0.2 to 1.5 feet per minute, drawing off the cleansed coarse sand from the bottom of the tower, and removing from the top of the tower the overflow consisting of oil, water, and oil-bearing clay and other fines.

2. The method of separating coarse sand from oil-bearing sands which comprises diluting the oil phase through the addition of a diluent of lesser specific gravity than the oil in an amount sufficient to reduce the specific gravity of the oil substantially below 1.00, agitating the oil-bearing sand in an excess of water to the extent necessary to substantially eliminate consolidation of the sand grains, feeding the sands into the upper portion of a tower, introducing a stream of water to the bottom of the tower under sufficient pressure to provide an upward water flow of from 0.2 to 1.5 feet per minute, drawing off the cleansed coarse sand from the bottom of the tower, and removing from the top of the tower the overflow consisting of oil, water, and oil-bearing clay and other fines.

3. The method of separating coarse sand from oil-bearing sands which comprises heating the sand, diluting the oil phase through the addition of a diluent of lesser specific gravity than the oil, in an amount sufficient to reduce the specific gravity of said heated oil substantially below 1.00, feeding the diluted oil-bearing sands into the upper portion of a tower, introducing a stream of water to the bottom of the tower under sufficient pressure to provide an upward water flow of from 0.2 to 1.5 feet per minute, drawing off the cleansed coarse sand from the bottom of the tower, and removing from the top of the tower the overflow consisting of oil, water, and oil-bearing clay and other fines.

4. The method of separating coarse sand from oil-bearing sands which comprises heating the sand, diluting the oil phase through the addition of a diluent of lesser specific gravity than the oil in an amount sufficient to reduce the specific gravity of the oil substantially below 1.00, agitating the oil-bearing sand in an excess of water to the extent necessary to substantially eliminate consolidation of the sand grains, feeding the sands into the upper portion of a tower, introducing a stream of water to the bottom of the tower under sufficient pressure to provide an upward water flow of from 0.2 to 1.5 feet per minute, drawing off the cleansed coarse sand from the bottom of the tower, and removing from the top of the tower the overflow consisting of oil, water and oil-bearing clay and other fines.

References Cited in the file of this patent
UNITED STATES PATENTS

| | | |
|---|---|---|
| 1,114,018 | Moore | Oct. 20, 1914 |
| 2,790,750 | Eyre | Apr. 30, 1957 |
| 2,794,711 | Hall | June 4, 1957 |